United States Patent
Bouzguarrou et al.

(10) Patent No.: US 11,915,004 B2
(45) Date of Patent: Feb. 27, 2024

(54) CONTROL FLOW PREDICTION

(71) Applicant: Arm Limited, Cambridge (GB)

(72) Inventors: Houdhaifa Bouzguarrou, Valbonne (FR); Thibaut Elie Lanois, Peymeinade (FR); Guillaume Bolbenes, Vallauris (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/556,166

(22) Filed: Dec. 20, 2021

(65) Prior Publication Data

US 2023/0195467 A1 Jun. 22, 2023

(51) Int. Cl.
*G06F 9/30* (2018.01)
*G06F 9/38* (2018.01)

(52) U.S. Cl.
CPC ........ *G06F 9/3844* (2013.01); *G06F 9/30054* (2013.01); *G06F 9/3816* (2013.01)

(58) Field of Classification Search
CPC ... G06F 9/3844; G06F 9/30054; G06F 9/3816
See application file for complete search history.

(56) References Cited

U.S. PATENT DOCUMENTS

2006/0036836 A1* 2/2006 Gelman .................. G06F 9/321
712/238
2007/0283134 A1* 12/2007 Smith .................. G06F 9/3836
712/E9.057

OTHER PUBLICATIONS

Lai et al.; Improving Branch Prediction Accuracy with Parallel Conservative Correctors; 2005 (Year: 2005).*
Manne et al.; Branch Prediction using Selective Branch Inversion; 1999 (Year: 1999).*
Kahn et al.; Thrifty BTB: A comprehensive solution for dynamic power reduction in branch target buffers; 2008 (Year: 2008).*

* cited by examiner

*Primary Examiner* — Corey S Faherty
(74) *Attorney, Agent, or Firm* — NIXON & VANDERHYE P.C.

(57) ABSTRACT

A data processing apparatus is provided that includes bimodal control flow prediction circuitry for performing a prediction of whether a conditional control flow instruction will be taken. Storage circuitry stores, in association with the control flow instruction, a stored state of the data processing apparatus and reversal circuitry reverses the prediction in dependence on the stored state of the data processing apparatus corresponding with a current state of the data processing apparatus when execution of the control flow instruction is to be performed.

11 Claims, 6 Drawing Sheets

CONTROL FLOW PREDICTION

TECHNICAL FIELD

The present disclosure relates to data processing. In particular, the present technique applies to control flow prediction.

DESCRIPTION

Bimodal control flow prediction circuitry offers a fast and spatially compact way to produce relatively accurate conditional control flow predictions (for at least some program structures). However, such predictors are generally incapable of considering patterns of the control flow instruction outcomes. In particular, such predictors tend to form their prediction for a particular control flow instruction based on the direction in which that control flow instruction has previously gone. This means that a control flow instruction, which follows a sequence (e.g. taken, taken, not taken, taken, taken, not taken) will be incorrect some (minority) proportion of the time. It would be preferable if such predictors could be made more accurate.

SUMMARY

Viewed from a first example configuration, there is provided a data processing apparatus comprising: bimodal control flow prediction circuitry configured to perform a prediction of whether a conditional control flow instruction will be taken, storage circuitry configured to store, in association with the control flow instruction, a stored state of the data processing apparatus; and reversal circuitry configured to reverse the prediction in dependence on the stored state of the data processing apparatus corresponding with a current state of the data processing apparatus when execution of the control flow instruction is to be performed.

Viewed from a second example configuration, there is provided a data processing method comprising: storing, in association with the control flow instruction, a stored state of a data processing apparatus; performing a prediction of whether a conditional control flow instruction will be taken; and reversing the prediction in dependence on the stored state of the data processing apparatus corresponding with a current state of the data processing apparatus when execution of the control flow instruction is to be performed.

Viewed from a third example configuration, there is provided a non-transitory computer-readable medium to store computer-readable code for fabrication of a data processing apparatus comprising: bimodal control flow prediction circuitry configured to perform a prediction of whether a conditional control flow instruction will be taken; storage circuitry configured to store, in association with the control flow instruction, a stored state of the data processing apparatus; and reversal circuitry configured to reverse the prediction in dependence on the stored state of the data processing apparatus corresponding with a current state of the data processing apparatus when execution of the control flow instruction is to be performed.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
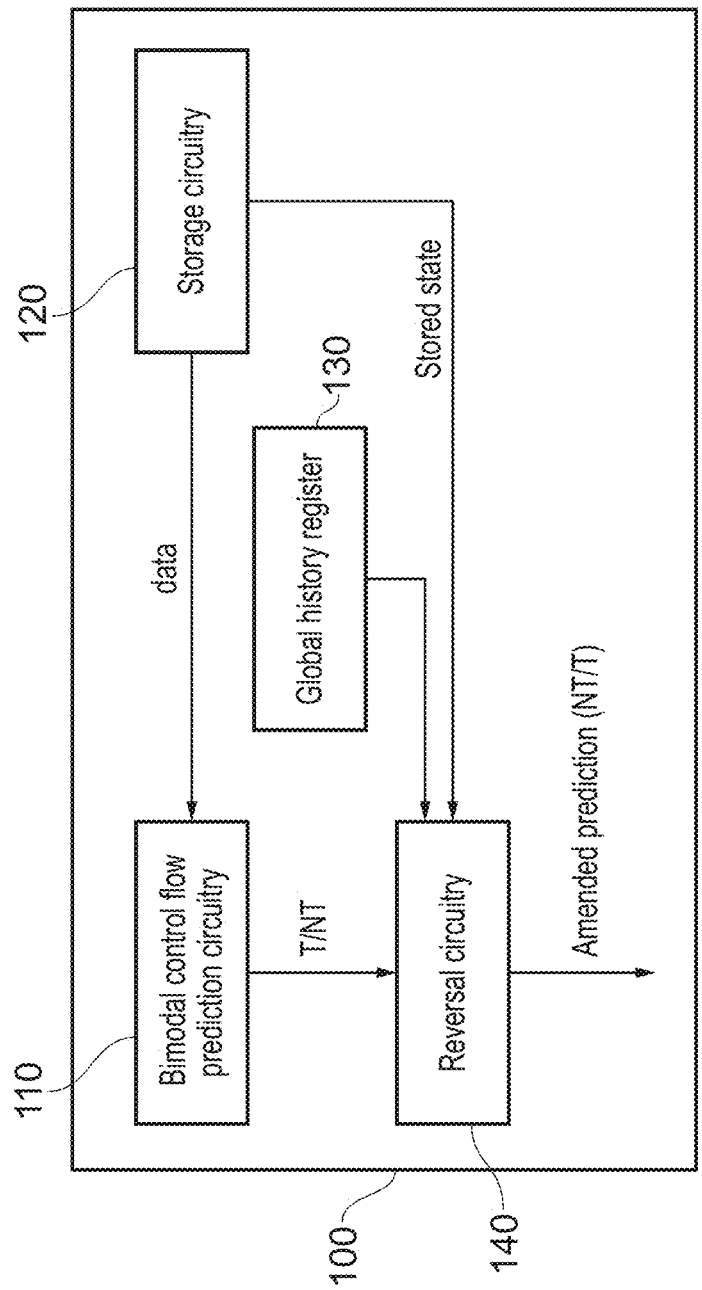
FIG. 1 illustrates a data processing apparatus in accordance with some examples.

Before discussing the embodiments with reference to the accompanying figures, the following description of embodiments is provided.

In accordance with one example configuration there is provided a data processing apparatus comprising: bimodal control flow prediction circuitry configured to perform a prediction of whether a conditional control flow instruction will be taken; storage circuitry configured to store, in association with the control flow instruction, a stored state of the data processing apparatus; and reversal circuitry configured to reverse the prediction in dependence on the stored state of the data processing apparatus corresponding with a current state of the data processing apparatus when execution of the control flow instruction is to be performed.

In these examples, the prediction for a particular conditional control flow instruction is made using bimodal prediction circuitry. The storage circuitry is then used to store a state of the data processing apparatus in association with the control flow instruction and when the current state of the data processing apparatus matches this stored state of the data processing apparatus, the prediction made by the bimodal control flow prediction circuitry is reversed. In this way, it is possible to gain the advantage achieved by fast, compact bimodal prediction circuitry while still making it possible to detect states of the data processing apparatus that indicates that the minority case of the sequence is due to occur and therefore that the prediction made by the bimodal control flow prediction circuitry should be reversed. An higher successful prediction rate, particularly in the case of sequences, can thereby be achieved.

In some examples, the control flow instruction is a conditional branch instruction. A conditional control flow instruction is one where the question of whether the control flow instruction is taken or not taken is dependent on some condition being met and so the question of whether the branch is taken or not cannot be determined until the execution time of the instruction.

In some examples, the reversal circuitry operates with a zero cycle latency. The reversal circuitry therefore takes less than one processor cycle for the reversal to be performed. In some embodiments, the prediction and, if appropriate, any reversal that is required is all performed in a single processor cycle and therefore can be used for immediate branch prediction. In such systems, more complicated branch predictors might be employed in addition that operate with a one or multi cycle latency. In this way, the present technique is able to provide a better prediction of the control flow instruction now while employing better (but slower) branch predictors to make better predictions for one or two cycles' time. This is better than waiting for the branch to resolve (which might take many processor cycles) and then having to perform a pipeline flush. In particular, by performing immediate branch prediction (e.g. with zero cycle latency) it is possible to make better use of the fetch stage of a pipeline since the next most likely block of instructions can be fetched.

In some examples, the data processing apparatus comprises global history storage circuitry configured to store a history of previous control flow instructions as the current state of the data processing apparatus. The history of previous control flow instructions can be stored in, for instance, a global history register (GHR). In practice, the history might be stored as, for instance, an N-bit bitmap that stores, for the last N control flow instructions, whether each control flow instruction was taken (e.g. '1') or not taken (e.g. '0'). In other examples, hashes of the history might be performed and/or combined. In any event, the history is intended to be a value that represents the direction of previous control flow instructions, which is thought to affect or imply the direction of later control flow instructions. It is possible, in some examples, to use the history itself as the basis for the branch prediction. However, such branch predictors tend to be slow (e.g. require significantly more than one processor cycle to provide predictions) and therefore are unsuitable forgiving immediate predictions. Furthermore, such branch predictors tend to store significant quantities of data, which is therefore unsuitable for when a small efficient circuit is desired. In the present technique, however, a small amount of history data is stored for the express purpose of indicating when a prediction performed by a small, efficient, bimodal predictor is to be changed. This therefore makes it possible to improve accuracy while maintaining the use of a small, efficient circuit.

In some examples, the stored state of the data processing apparatus is a required value of the global history storage circuitry; and the current state of the data processing apparatus corresponds with the stored state of the data processing apparatus when a current value of the global history register matches the required value of the global history storage circuitry. Thus in these examples, a particular value of the global history storage circuitry is stored and when that matches the current value of the global history storage circuitry (and if any other requisite conditions are met) then the prediction generated from the bimodal control flow prediction circuitry is reversed.

In some examples, the storage circuitry is configured to store, in association with the control flow instruction, a bloom filter comprising a plurality of stored states of the data processing apparatus; and the current state of the data processing apparatus corresponds with the stored state of the data processing apparatus when the current state of the data processing apparatus is one of the plurality of stored states of the data processing apparatus. A bloom filter is a data structure in which it is possible to determine whether an element is within a set (with some probability). In practice, the structure can be stored more efficiently that simply storing the elements within the set.

The more efficient storage comes at the cost of only probabilistic membership detection of the set but this probabilistic membership is one way. In particular, it is possible to determine that an element is definitely not in the set, but not that it definitely is in the set. Possible answers to membership are thus 'maybe' or 'no'. In these examples, the bloom filter is used to store a number of states of the data processing apparatus and the reversal of the prediction produced by the bimodal prediction circuitry occurs if the current state of the data processing apparatus is (i.e. might) be in the bloom filter set. In some examples, the bloom filter therefore acts as a list of values of the current state of the data processing apparatus that will cause reversal of the prediction to occur.

In some examples, the storage circuitry is configured to store, in association with the control flow instruction, a confidence value; and the reversal circuitry is configured to reverse the prediction in further dependence on the confidence value associated with the control flow instruction meeting or exceeding a threshold. A further condition that can be employed is that the confidence value associated with the control flow instruction is above the threshold (which, e.g. is between 50% and 100%). The confidence value can be increased as a consequence of correct reversal of the bimodal circuitry predictor prediction and/or decreased by incorrect reversal of the bimodal circuitry predictor prediction. This helps to ensure that the reversal occurs correctly (e.g. predictably). In some examples, such as whether a bloom filter or other probabilistic data structure is used, the confidence value is used together with membership of the probabilistic data structure to determine whether the probabilistic data structure should be reset. For instance, if the confidence drops to a low value and the bloom filter is over 50% capacity, then the bloom filter might be reset. This helps with the use of probabilistic data structures (such as some kinds of bloom filter), where entries cannot be arbitrarily removed. In particular, if so many situations are identified in which reversal should occur that the accuracy of the reversal drops below a given limit then the data structure that stores the conditions (values of the state of the data processing apparatus) can be reset.

In some examples, the storage circuitry is configured to store, in association with the control flow instruction, an enable bit; and the reversal circuitry is configured to reverse the prediction in further dependence on the enable bit. The enable bit can therefore be used to enable or disable the application of the reversal. For instance, if the enable bit indicates that reversal should take place (which could be achieved by storing a '0' or a '1' as the enable bit) then reversal takes place when the conditions are met, otherwise it does not.

In some examples, the storage circuitry is configured to store, in association with the control flow instruction and the stored state of the data processing apparatus, data suitable for performing the prediction. For instance, the data suitable per performing the prediction might be a saturated counter such as a 2-bit saturated counter that represents the states (−2: strongly not taken; −1: weakly not taken; 1: weakly taken; 2: strongly taken), the strength indicating a confidence of the prediction and the taken/not taken indicating the prediction itself. Such a saturated counter cannot go above 2 or below −2 and increases each time the particular control flow instruction is taken and decreases each time it is not taken (of course, all values could be inverted and the storing of a negative number is not necessary and can simply be achieved with the values 0, 1, 2, and 3).

In some examples, the bimodal control flow prediction circuitry is configured to consider a block of instructions; the control flow instruction is a first conditional control flow instruction in the block of instructions; and the storage circuitry is configured to store the stored state of the data processing apparatus in association with the block of instructions. Control flow prediction techniques can work on blocks of instructions rather than on an instruction-by-instruction basis. In this sense, the identity of a control flow instruction might be represented by a block ID and an offset into the block. In these examples, the control flow instruction is the first conditional control flow instruction within that block.

In some examples the block of instructions comprises a second control flow instruction; and the storage circuitry is configured to store further data for performing a further prediction in respect of the second control flow instruction and further a further stored state of the data processing apparatus both in association with the block of instructions. The block of instructions may therefore contain multiple control flow instructions. By storing data relating to the multiple control flow instructions it is possible to inhibit or prevent multiple control flow instructions from 'fighting' over a single entry in the storage circuitry and continually overwriting data stored for each other.

In some examples, the second control flow instruction is an unconditional control flow instruction. In contrast a conditional control flow instruction an unconditional control flow instruction is one whose outcome is not dependent on the result of a condition being met. For instance, the instruction "branch r1" might branch to an instruction whose address is stored in register r1. This is an example of an indirect but unconditional branch instruction since the branch always occurs.

In some examples, the second control flow instruction is an unconditional branch instruction.

Particular embodiments will now be described with reference to the figures.

FIG. 1 illustrates a data processing apparatus 100 in accordance with some examples. The data processing apparatus 100 includes bimodal control flow prediction circuitry 110. When a conditional control flow instruction (such as a conditional branch instruction) is encountered, the bimodal control flow prediction circuitry 110 produces a prediction as to the direction that the branch instruction will go. The data processing apparatus 100 could be, or could form part of a nano BTB or pico BTB, which might take place at the fetch stage of a pipeline, for instance. By performing a basic fetch early on in the pipeline, it is possible to allow the fetch stage to proceed intelligently without requiring the branch to resolve and/or without having to wait for a more complicated (but hopefully highly accurate) branch predictor to produce a prediction. This is particularly useful in higher bandwidth fetch stages.

The bimodal control flow prediction circuitry 110 is such that a prediction is produced for a given control flow instruction in a same processor cycle at which the control flow instruction is encountered. In other words, the bimodal control flow prediction circuitry 110 is said to have a zero-cycle latency and specifically, a full processor cycle is not used in order to produce the prediction. The circuitry 110 uses a bimodal predictor and the history of previous executions of the control flow instruction are taken into account when predicting which direction the control flow instruction will go in the future. This can be achieved using data stored in the storage circuitry 120 in relation to the control flow instruction. For instance, a saturating 2-bit counter can be used to indicate whether, based on previous history, there is a strong or weak prediction that the branch will be taken or not taken. The outcome moves the counter in the direction of 'strongly taken' or 'strongly not taken' as appropriate.

Although such a branch predictor 110 is low (zero) latency, it does not specifically look for patterns in the conditional control flow instructions, but instead simply considers the majority direction of each control flow instruction in the last four executions of that control flow instruction. That is, a control flow instruction that executes with the sequence: taken, taken, taken, not taken, taken, taken, taken, not taken, . . . simply predicts 'taken' as the outcome (based on the majority outcome) and so will be incorrect once out of every four predictions.

The present technique therefore uses the storage circuitry 120 to store information that makes it possible to predict when the prediction should be reversed. In particular, the storage circuitry 120 stores a stored state of the data processing apparatus 100 in association with the control flow instruction. Then, when a prediction is to be made for the control flow instruction, a current state of the data processing apparatus 100 (e.g. as stored in the global history register 130) is compared to the stored state. Where there is a correspondence, the prediction (taken/not taken) made by the bimodal control flow prediction circuitry is reversed. The stored states therefore represent states of the data processing apparatus 100 where the prediction should be inverted. For instance, taking the above example, the stored states could represent the situation where the outcome of the branch will be 'not taken' in order to complement the normal prediction of 'taken'.

Figure 2:
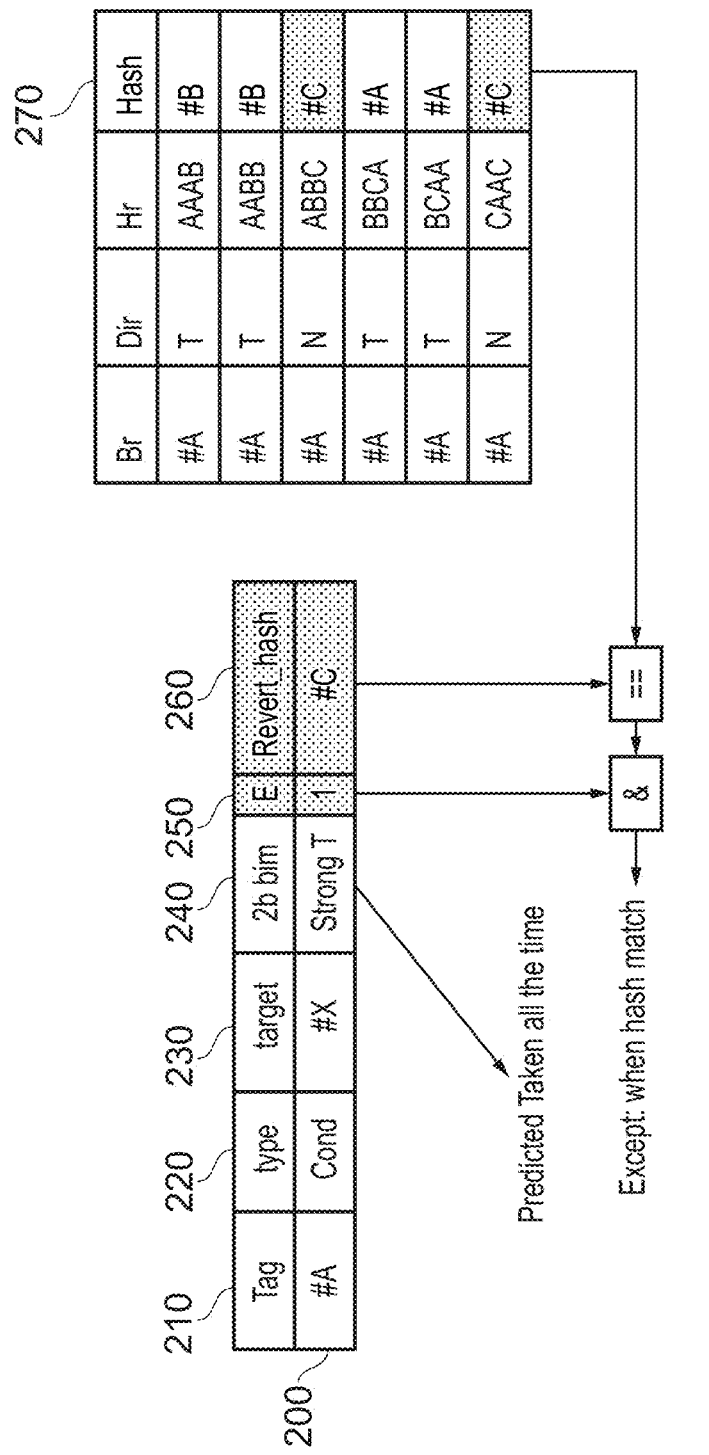
FIG. 2 shows the operation of the data processing apparatus in more detail.

FIG. 2 shows the operation of the data processing apparatus 100 in more detail. Here, an entry 200 of the storage circuitry 120 contains a tag 210 (#A) that corresponds with a control flow instruction. This could be an address of the control flow instruction, a hash of the address of the control flow instruction, or the identity of a block of instructions containing the control flow instruction. This entry is therefore referenced when the control flow instruction (or block of instructions) is encountered. The 'type' field 220 indicates that this relates to a conditional control flow (e.g. branch) instruction. The target 230 indicates the predicted target of the branch. The 2-bit saturated counter 240 is an item of data used by the bimodal branch predictor 110 to make its prediction. Here, the data indicates that the state is "strongly taken", meaning that at least the previous two executions of this control flow instruction resolved to "taken". The prediction made by the bimodal branch predictor 110 simply corresponds with this data. That is, until the data stored in the counter 240 changes, the prediction will be "taken". An enable bit 250 is provided to enable or disable the reversal from occurring. In this example, a '1' means that the reversal is permitted to occur. Finally, the reversal hash 260 (#C) is a stored state of the data processing apparatus 100 that is compared to a current value of the data processing apparatus 100 to determine whether the reversal should take place. In this case, the value is actually a hash of the global history rather than using the full global history (for instance). But the full value of the global history register 130 could be taken, or indeed other states of the data processing apparatus could be considered instead or as well.

Here, if there is a match between the current and stored global history hashes and if the enable bit is set to '1' then the prediction is reversed.

The table 270 provides a series of executions of the control flow instruction with tag #A in order to demonstrate the outcome. In this case, the hash of the global history that is used is to simply consider the most recent (previous) branch outcome. Therefore, where the history register is 'XYZ', the hash is simply 'Z'. The outcomes follow the simple pattern taken, taken, not taken, . . . . As will be noted, each time the branch outcome is "not taken", the hash of the history register is #C. Consequently, the general prediction made by the bimodal branch predictor (taken) is generally correct. On occasions where the hash of the history register is #C, the prediction will be inverted to not taken, and indeed, this happens to always represent the situation where the direction of the branch instruction is "not taken". Therefore, the overall quality of (amended) predictions that are produced is improved without having a significant detrimental effect on the latency of the prediction mechanism. In particular, the entire process can still operate with a zero-cycle latency.

There are a number of possibilities for hash function. Generally, however, these will consider the outcome of the previous X control flow instructions or conditional control flow instructions.

A further consideration relates to the data 240 used to produce the predictions (e.g. the saturated counter). If the counter inverts (e.g. if the prediction switches from not taken to taken, or vice-versa) then the stored state 260 of the data processing apparatus is erased. This is because the situations in which the prediction must be reversed will no longer apply.

Figure 3:
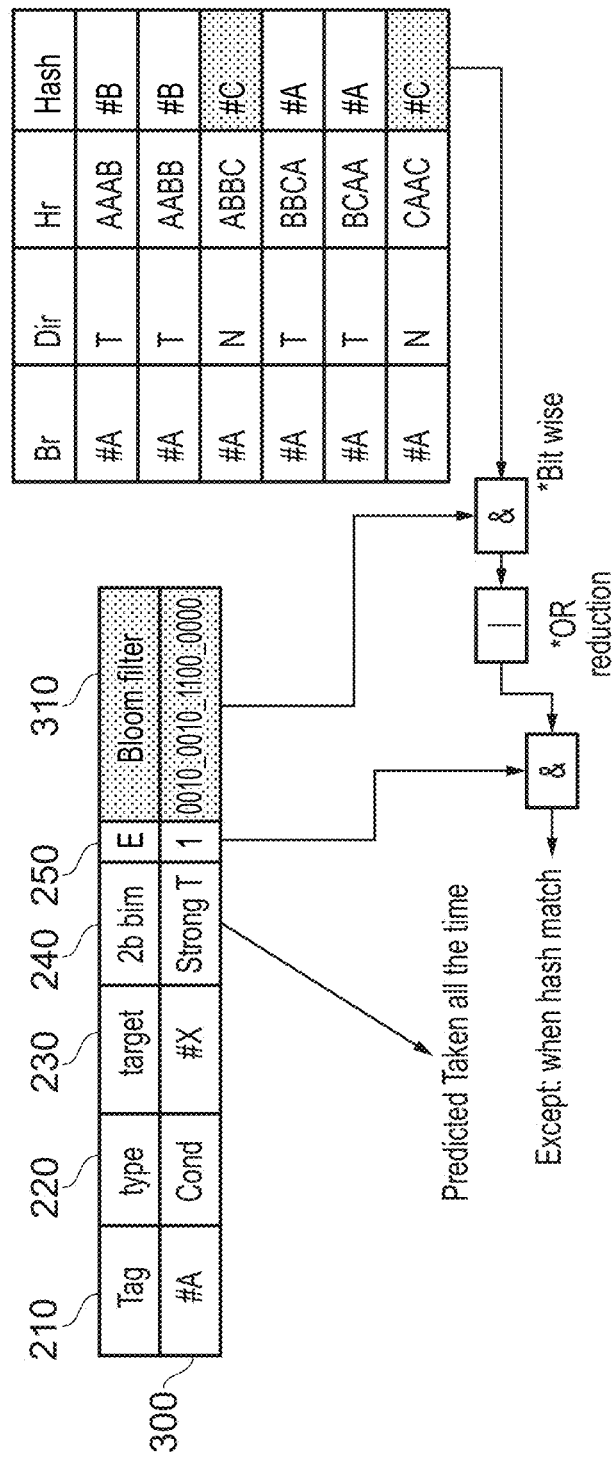
FIG. 3 illustrates a variant in which the entry in the storage circuitry stores state data in the form of a bloom filter.

FIG. 3 illustrates a variant in which the entry 300 in the storage circuitry 120 stores state data in the form of a bloom filter 310. A bloom filter is a data structure that can be used to determine membership of a set without resorting to having to store the entirety of the set. The data structure is a compact representation but the cost of this is that the bloom filter does not provide absolute certainty. In particular, the answer to whether a particular entry has membership or not is 'no' or 'maybe' (it is not possible to tell for certain that an entry is present). In this example, the bloom filter is used to store a set of states of the data processing apparatus 100 (e.g. global history hashes) that will cause the prediction of the bimodal control flow prediction circuitry 110 to be reversed by the reversal circuitry 140. Membership can be tested by performing a logical AND operation between the value to be tested (the current value of the data processing apparatus 100 obtained from, for instance, a global history register 130) and the bloom filter 310 itself. A logical OR reduction is then performed on the result of the logical AND operation (that is, an OR operation is performed between each of the bits that result from the AND operation). If the result of the OR reduction is a '1' then the current data value might be in the set and so a reversal can occur. In this example, the enable bit must also be set in order for a reversal of the prediction to occur.

Figure 4:
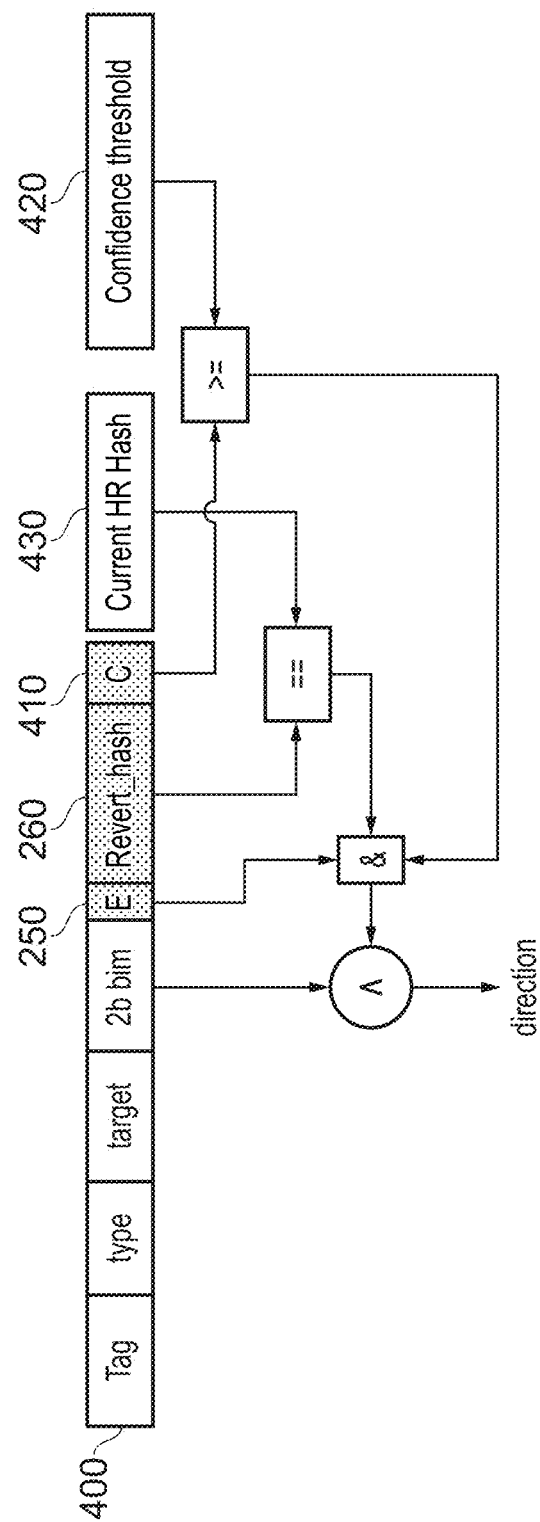
FIG. 4 shows an example in which the entry contains a confidence value.

FIG. 4 shows an example in which the entry 400 contains a confidence value 410. In addition to requiring that the enable bit 250 is set and requiring that the stored state 260 of the data processing apparatus matches the current value stored in the global history register 130, the confidence value 410 must be greater than or equal to a confidence threshold 420. The confidence value 410 can be increased when the reversal of the prediction turns out to be the correct action and decreased when the reversal of the prediction is the incorrect action (as determined when the control flow instruction is ultimately resolved). The confidence threshold (e.g. 75%) determines what level of confidence is required for the reversal to be possible.

Clearly in this situation, some mechanism is needed in order to initialize new values or to continue to allow low confidence reversals to be tried (to see if the confidence improves). There are a number of ways of achieving this. New entries could be created with a maximum confidence, for instance. In terms of handling low confidence entries, the confidence value 410 could be overridden some percentage of the time (e.g. 10% of the time) or the confidence value 410 could represent a probability with which the reversal is applied (assuming other conditions are met). Another possibility is that the feedback mechanism used for the main predictor is used to update the confidence value 410. For instance, the current global history register 130 hash value 430 could be stored until the branch is resolved and if it turns out that the main predictor was incorrect (e.g. should have been reversed) once resolved, and if the reversal would have occurred but for the confidence value 410 being too low then the confidence value 410 can be increased. Other techniques of updating confidence values for branch prediction will be known to the skilled person and can be applied here.

Note that although this example illustrates the use of the confidence value in respect of a single stored data state, it is equally applicable to use the bloom filter. Indeed, one feature of a bloom filter is that entries usually cannot be removed. Consequently, over time, a bloom filter tends to become saturated and eventually concludes that any entry "might" be present in the set. If membership of the bloom filter reaches some percentage (say 50%) and if the confidence value drops below a particular point (such as the previously mentioned threshold, e.g. 75%) then the bloom filter can be reset (e.g. emptied).

Similarly, it will be appreciated that the revert hash value 260 or revert bloom filter 310 can be determined by simply storing the hash values (e.g. the hash of the current value of the global history register 130 at the time a control flow instruction is encountered) and tracking whether the prediction produced by the bimodal control flow prediction circuitry 110 was wrong. Hash values that are repeatedly linked to incorrect predictions from the bimodal control flow prediction circuitry 110 are stored.

Figure 5:
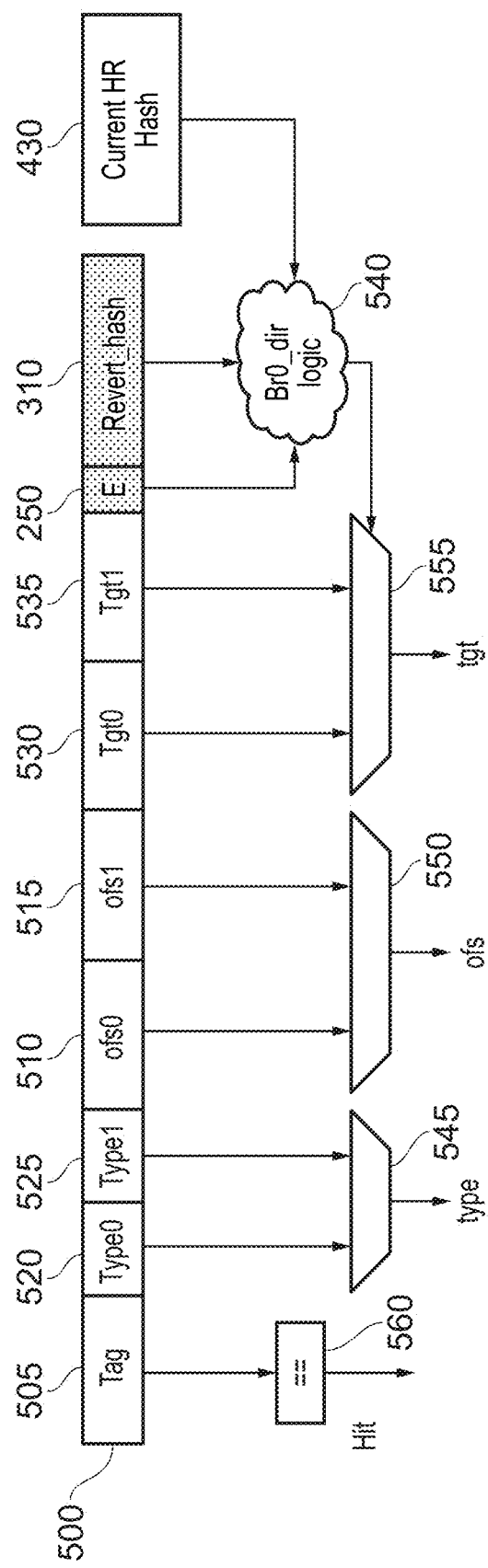
FIG. 5 shows a variant in which a single entry of the storage circuitry stores data relating to a plurality of control flow instructions that might be encountered within a single block of instructions.

FIG. 5 shows a variant in which a single entry 500 of the storage circuitry 120 stores data relating to a plurality of control flow instructions that might be encountered within a single block of instructions. One common data structure is a two-way branch. That is, a first conditional branch instruction followed by a second unconditional branch instruction. In this example, the first conditional branch instruction might cause a branch if a condition is met. If the condition is not met, then the second unconditional branch instruction is executed. In either case, there is a branch, but the target of the branches might be different. In the process described so far (particularly where the instruction tag is the ID of a block of instructions), the two branch instructions would fight for the same entry and would cause eviction to occur.

The structure shown in FIG. 5 helps to resolve this. In particular, a single entry contains not only the tag 505 (e.g. the ID of the block of instructions containing the branch instructions) but also a first offset 510 into the block of the first (conditional) branch instruction and a second offset 515 into the block of the second (unconditional) branch instruction—with the second (unconditional) branch instruction following the first (conditional) branch instruction. The fields 'type0' 520 and 'Type1' 525 are presented here for convenience, but in practice, the type of the first branch/control flow instruction will be 'conditional' and the type of the second branch/control flow instruction will be 'unconditional'. Target prediction fields 530, 535 are also presented for the first and second control flow instructions, respectively. Branch direction logic 540 merely takes the form of the circuits previously illustrated in FIGS. 2-4 in which hash values are compared (possibly together with enable bits and/or confidence values) in order to determine whether a reversal occurs or not. In this example, however, the output is used as a selection signal to multiplexers 545, 550, 555, which select between the types 520, 525, the offsets 510, 515, and the targets 530, 535, respectively. A hit on the entry occurs if comparison circuitry 560 matches the identity of the current block of instructions with the identity of the block of instructions for this entry.

The minority detection system previously described relates to the conditional control flow instruction, as described above. Since the entry 500 is able to differentiate between the unconditional and conditional control flow instructions, the prediction for one control flow instruction does not interfere with the other and consequently, it remains clear what a reversal of the conditional branch instruction means. Furthermore, by employing compression (e.g. by considering only part of the program counter for the tag 505) and by considering only a small offset 510, 515 (e.g. of 8 bits), it is possible to store the 'additional' information relating to the second unconditional branch instruction in a single entry 500 that occupies the same amount of space as a regular branch prediction entry.

Figure 6:
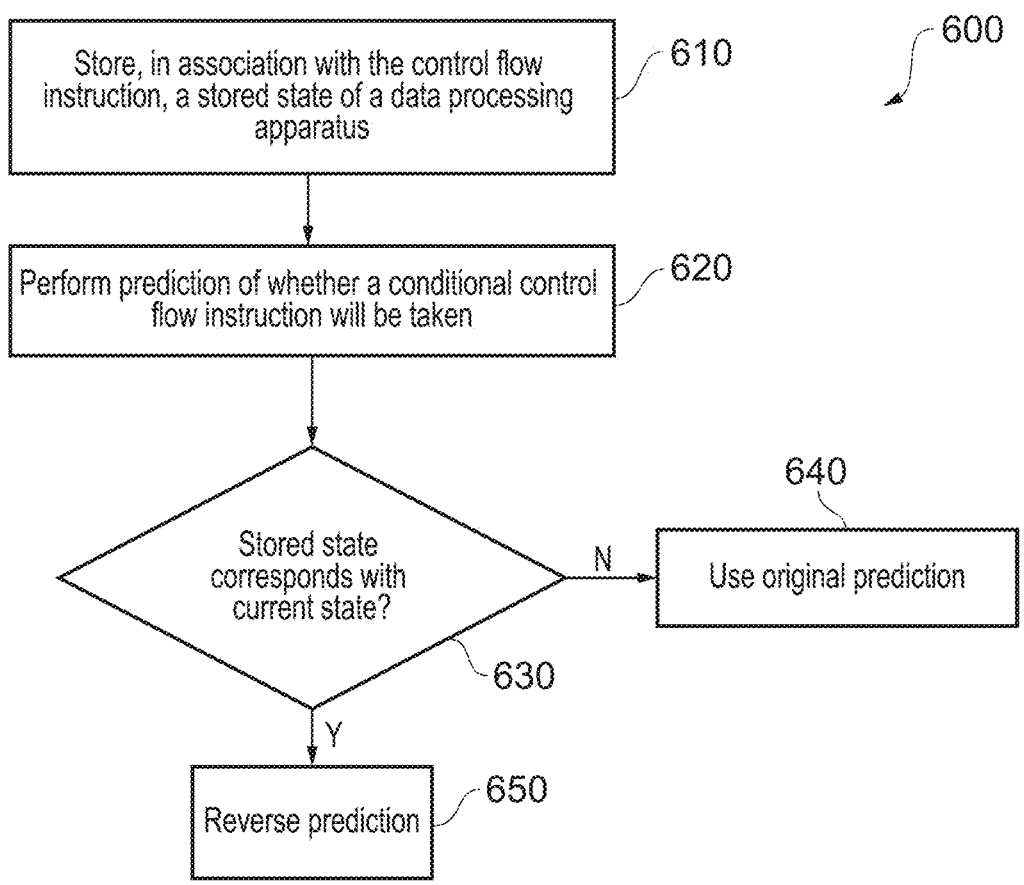
FIG. 6 shows a flowchart that illustrates a method of data processing in accordance with some examples.

FIG. 6 shows a flowchart 600 that illustrates a method of data processing in accordance with some examples. At a step 610, a stored state of a data processing apparatus is stored in association with a conditional control flow instruction. At a step 620, when the conditional control flow instruction is encountered, a prediction of whether the conditional control flow instruction will be taken or not is performed, e.g. by bimodal control flow prediction circuitry 110. At a step 630, it is determined whether the stored state (stored in step 610) corresponds with a current state of the data processing apparatus. If not, then the original prediction (made at step 620) is kept at step 640. Otherwise, at step 650, the prediction made at step 620 is reversed. The steps 620-650 may be performed in a single processor cycle.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   bimodal control flow prediction circuitry configured to consider a block of instructions comprising a conditional control flow instruction having a first target address and an unconditional control flow instruction having a second target address and perform a prediction of whether the conditional control flow instruction with the first target address will be taken, or whether the unconditional control flow instruction with the second target address will be taken;
   storage circuitry configured to store, in association with the block of instructions, a stored state of the data processing apparatus, the first target address associated with the conditional control flow instruction and the second target address associated with the unconditional control flow instruction; and
   reversal circuitry configured to reverse the prediction in dependence on the stored state of the data processing apparatus corresponding with a current state of the data processing apparatus when execution of the conditional control flow instruction is to be performed.

2. The data processing apparatus according to claim 1, wherein the reversal circuitry operates with a zero cycle latency.

3. The data processing apparatus according to claim 1, comprising:
   global history storage circuitry configured to store a history of previous control flow instructions as the current state of the data processing apparatus.

4. The data processing apparatus according to claim 3, wherein
   the stored state of the data processing apparatus is a required value of the global history storage circuitry; and
   the current state of the data processing apparatus corresponds with the stored state of the data processing apparatus when a current value of the global history register matches the required value of the global history storage circuitry.

5. The data processing apparatus according to claim 1, wherein
   the storage circuitry is configured to store, in association with the block of instructions, a bloom filter comprising a plurality of stored states of the data processing apparatus; and
   the current state of the data processing apparatus corresponds with the stored state of the data processing apparatus when the current state of the data processing apparatus is one of the plurality of stored states of the data processing apparatus.

6. The data processing apparatus according to claim 1, wherein
   the storage circuitry is configured to store, in association with the block of instructions, a confidence value; and
   the reversal circuitry is configured to reverse the prediction in further dependence on the confidence value associated with the control flow instruction meeting or exceeding a threshold.

7. The data processing apparatus according to claim 1, wherein
   the storage circuitry is configured to store, in association with the block of instructions, an enable bit; and
   the reversal circuitry is configured to reverse the prediction in further dependence on the enable bit.

8. The data processing apparatus according to claim 1, wherein
   the storage circuitry is configured to store, in association with block of instructions and the stored state of the data processing apparatus, data suitable for performing the prediction.

9. The data processing apparatus according to claim 1, wherein the second control flow instruction is an unconditional branch instruction.

10. A data processing method comprising:
    considering a block of instructions comprising a conditional control flow instruction having a first target address and an unconditional control flow instruction having a second target address;
    performing a prediction of whether the conditional control flow instruction having the first target address will be taken, or whether the unconditional control flow instruction having the second target address will be taken;

storing, in association with the block of instructions, a stored state of the data processing apparatus, the first target address associated with the conditional control flow instruction and the second target address associated with the unconditional control flow instruction;

reversing the prediction in dependence on the stored state of the data processing apparatus corresponding with a current state of the data processing apparatus when execution of the conditional control flow instruction is to be performed.

11. A non-transitory computer-readable medium to store computer-readable code for fabrication of a data processing apparatus comprising:

bimodal control flow prediction circuitry configured to consider a block of instructions comprising a conditional control flow instruction having a first target address and an unconditional control flow instruction having a second target address and perform a prediction of whether the conditional control flow instruction having the first target address will be taken, or whether the unconditional control flow instruction having the second target address will be taken;

storage circuitry configured to store, in association with the block of instructions, a stored state of the data processing apparatus, the first target address associated with the conditional control flow instruction and the second target address associated with the unconditional control flow instruction; and reversal circuitry configured to reverse the prediction in dependence on the stored state of the data processing apparatus corresponding with a current state of the data processing apparatus when execution of the conditional control flow instruction is to be performed.

* * * * *